E. H. ROBBINS.
Improvement in Pipe-Wrenches.

No. 114,348.  Patented May 2, 1871.

Witnesses:
A. Bennerkendorf.
Wm H. C. Smith.

Inventor:
E. H. Robbins.
PER  Munn & Co
Attorneys.

UNITED STATES PATENT OFFICE.

EUGENE H. ROBBINS, OF PITTSFIELD, MASSACHUSETTS.

IMPROVEMENT IN PIPE-WRENCHES.

Specification forming part of Letters Patent No. 114,348, dated May 2, 1871.

*To all whom it may concern:*

Be it known that I, EUGENE H. ROBBINS, of Pittsfield, in the county of Berkshire and State of Massachusetts, have invented a new and Improved Pipe-Hook; and I do hereby declare that the following is a full, clear, and exact description thereof, which will enable others skilled in the art to make and use the same, reference being had to the accompanying drawing, forming part of this specification.

This invention relates to improvements in tools for turning wrought-iron pipes in the manner that pipe-tongs are used; and it consists in a lever or bar of metal with a curved and serrated end; or it may be angled or pointed, having a chain and a claw-hook or stud so attached near the serrated or pointed end that when the said end is placed on the pipe the chain may be passed around under the pipe and hitched to the claw, in a manner to gripe the pipe firmly when the lever is lifted so as to hold and turn the pipe.

Figure 1:
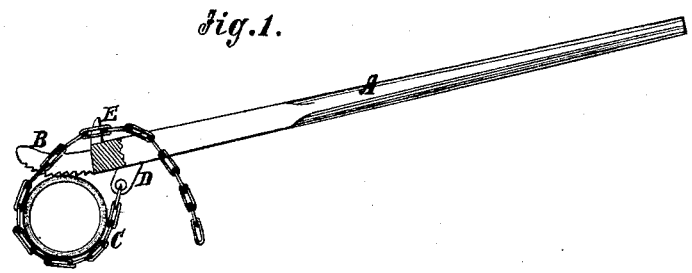
Figure 2:
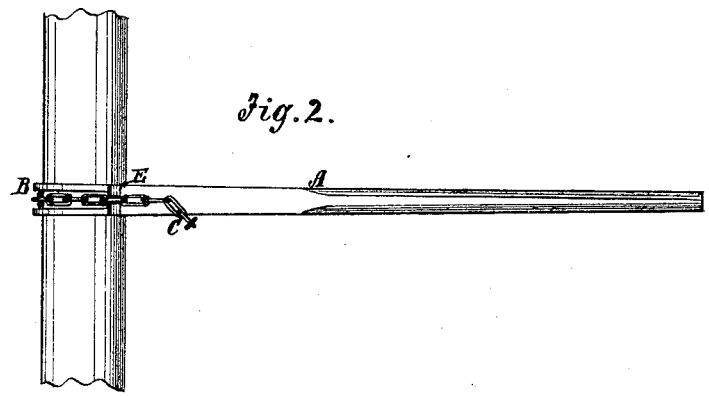

Figure 1 is a sectional elevation of my improved pipe-hook, and Fig. 2 is a plan view of the same.

Similar letters of reference indicate corresponding parts.

A is the iron bar or handle, having the curved and serrated end B; or it may be pointed or angled, as preferred, and in this instance is bifurcated about as far as the bend extends. C is a chain, attached at one end to the eyebolt D. Attached to the under side, a little above the curved part E, is a notched claw, rising from the upper side of the lever above the bent and bifurcated part.

This implement is used by placing the serrated, pointed, or angled part on the pipe, drawing the chain around under from the front and over the top to the claw, where it is secured by dropping one of the links edgewise in the notched claw, so that the next link will be stopped against the front of the claw. The lever being then raised, the pipe will be firmly griped, so as to be turned.

Instead of making the bifurcation in the end of the lever and employing one chain, I may double the chain a part of its length, so that the end B of the lever will work between the two parts, which may be connected one to each side of the line.

I may also employ a hook or other fastening in place of the claw.

I may also use a chain with one or more of the links serrated, or may attach one or more serrated pieces of steel or other metal to the chain.

Having thus described my invention, I claim as new and desire to secure by Letters Patent—

The combination, with the lever, of the chain and claw for connecting the chain, all arranged substantially as specified.

EUGENE H. ROBBINS.

Witnesses:
W. W. GAMWELL,
E. N. ROBBINS.